US011906731B2

(12) United States Patent
Blomstedt et al.

(10) Patent No.: US 11,906,731 B2
(45) Date of Patent: Feb. 20, 2024

(54) WAVEGUIDE ELEMENT AND WAVEGUIDE STACK FOR DISPLAY APPLICATIONS

(71) Applicant: DISPELIX OY, Espoo (FI)

(72) Inventors: Kasimir Blomstedt, Espoo (FI); Juuso Olkkonen, Espoo (FI)

(73) Assignee: DISPELIX OY, Espoo (FI)

( * ) Notice: Subject to any disclaimer, the term of this patent is extended or adjusted under 35 U.S.C. 154(b) by 759 days.

(21) Appl. No.: 17/041,279

(22) PCT Filed: Mar. 8, 2019

(86) PCT No.: PCT/FI2019/050188
§ 371 (c)(1),
(2) Date: Sep. 24, 2020

(87) PCT Pub. No.: WO2019/185977
PCT Pub. Date: Oct. 3, 2019

(65) Prior Publication Data
US 2021/0109347 A1 Apr. 15, 2021

(30) Foreign Application Priority Data
Mar. 28, 2018 (FI) ...................................... 20185295

(51) Int. Cl.
*G02B 27/00* (2006.01)
*G02B 6/293* (2006.01)
(Continued)

(52) U.S. Cl.
CPC ..... *G02B 27/0081* (2013.01); *G02B 6/29323* (2013.01); *G06F 1/1607* (2013.01); *G02B 27/0172* (2013.01)

(58) Field of Classification Search
CPC ............ G02B 27/0081; G02B 6/29323; G02B 27/0172; G02B 6/0076; G02B 27/1006;
(Continued)

(56) References Cited

U.S. PATENT DOCUMENTS 9,791,703 B1 * 10/2017 Vallius .................. G02B 6/005
2006/0018019 A1 1/2006 Niv et al.
(Continued)

FOREIGN PATENT DOCUMENTS

WO 2007141587 A1 12/2007
WO 2017180403 A1 10/2017

OTHER PUBLICATIONS

FI Search Report in Application No. 20185295 dated Oct. 26, 2018.

*Primary Examiner* — James C. Jones
*Assistant Examiner* — Henry Duong
(74) *Attorney, Agent, or Firm* — Maschoff Brennan

(57) ABSTRACT

The invention relates to a waveguide display element comprising a waveguide body and an in-coupling grating (21) arranged to the waveguide body. The in-coupling grating (21) is configured to couple incoming light into the waveguide body into two separate directions (26A, 26B) using opposite diffraction orders (IC:+1, IC:−1) for splitting the field of view of the incoming light. Further the in-coupling grating (21) is configured, typically by setting its period suitably short, such that said coupling takes place only at wavelengths below a threshold wavelength residing in the visible wavelength range. The invention also relates to a waveguide stack (51 A, 51 B, 51 C).

13 Claims, 5 Drawing Sheets

(51) Int. Cl.
  *G06F 1/16*      (2006.01)
  *G02B 27/01*     (2006.01)
(58) Field of Classification Search
  CPC ........ G02B 2027/0174; G02B 27/1086; G02B
    27/4272; G02B 5/1823; G02B 5/1842;
    G02B 5/1861; G02B 27/4205; G02B
    5/18; G02B 6/2848; G06F 1/1607; G03H
    1/0408; G03H 2001/2226
  USPC .......................................................... 359/34
  See application file for complete search history.

(56)         References Cited

U.S. PATENT DOCUMENTS

2006/0221448  A1    10/2006  Nivon et al.
2010/0134534  A1*   6/2010   Seesselberg ......... G02B 6/0038
                                                345/690
2011/0019874  A1*   1/2011   Jarvenpaa .............. A61B 3/113
                                                382/103
2014/0185142  A1    7/2014   Gupta et al.
2017/0329140  A1*   11/2017  Yeoh .................... G02B 6/0031
2018/0052501  A1    2/2018   Jones, Jr. et al.
2019/0187474  A1*   6/2019   Bhargava ........... G02B 27/0944

* cited by examiner

WAVEGUIDE ELEMENT AND WAVEGUIDE STACK FOR DISPLAY APPLICATIONS

FIELD OF THE INVENTION

The invention relates to waveguide-based displays. In particular, the invention relates to a light in-coupling arrangement for use in such displays. The invention can be used in modern personal displays, such as head-mounted displays (HMDs) and head-up displays (HUDs).

BACKGROUND OF THE INVENTION

To maximize the field of view of see-through augmented reality (AR) displays based on diffractive waveguides, a common approach is to use multiple waveguides stacked on top of each other. To make the optimization process manageable, it is desirable that each lightguide in-couples only a single wavelength (e.g. laser light) or a narrow wavelength band (e.g. spectrum of a single color led). Some approaches based on polarization has been presented earlier, e.g. in US 2014/0064655 A1. Typically, surface relief gratings are not very polarization sensitive over a large field of view (FOV) which causes cross-coupling between the plates and leads to color variations over a uniform white image.

Some conventional in-coupling solutions also require a relatively large area on the waveguide and/or set some undesired restrictions on the form factor of the waveguide, limiting their use in practical applications.

Thus, there is a need for improved in-coupling schemes.

SUMMARY OF THE INVENTION

It is an aim of the invention to address the abovementioned problem and in particular to provide a novel waveguide element and waveguide stack by which cross-coupling can be reduced and/or the waveguide surface area used better.

According to a one aspect, there is provided a waveguide display element comprising a waveguide body and an in-coupling grating arranged to the waveguide body. The in-coupling grating is configured to couple incoming light into the waveguide body into two separate directions using opposite diffraction orders for splitting the field of view of the incoming light. Further the in-coupling grating is configured, typically by setting its period suitably short, such that said coupling takes place only at wavelengths below a threshold wavelength residing in the visible wavelength range.

According to another aspect, there is provided a waveguide stack for diffractive displays, the stack comprising at least two waveguide layers, wherein at least one of the waveguide layers is a waveguide element of the above kind.

According to a further aspect, there is provided a see-through display device comprising a waveguide or stack as discussed above, and a multicolor image projector directed at the in-coupling grating.

In particular, the invention is characterized by what is stated in the independent claims.

The invention offers significant benefits. Most notably, it provides a selective in-coupler usable for realization of high-quality user-friendly multi-color displays. In particular, cross-coupling between layers is prevented while maintaining the ability to provide a large FOV.

The dependent claims are directed to selected embodiments of the invention.

In some embodiments, the threshold wavelength is selected from the range of 500-540 nm or 620-660 nm, such as 510-530 nm or 630-650 nm. The threshold wavelength can be e.g. 520 nm or 640 nm. This provides the possibility to separate blue and green, and, on the other hand, green and red wavelengths from each other. In particular the first separation has been challenging in high-FOV applications due to the overlapping wavelength ranges of the colors, in particular when uncoherent LED light sources are used.

In some embodiments, the waveguide body is made of transparent material having an index of refraction higher than 1.8, such as 1.9-2.1.

In some embodiments, the element further comprises two first reflective gratings or first exit pupil expander gratings on different sides of the in-coupling grating corresponding to said separate directions, at least one second exit pupil expander gratings adapted to receive light from the two first gratings, respectively, and a single out-coupling grating adapted to receive light from the at least one second exit pupil expander grating. The out-coupling grating reconstructs the field of view split in the in-coupler. Typically, there is either a single second exit pupil expander grating or two second exit pupil expander gratings at least partly on different sides of the out-coupling gratings, in which case the second exit pupil expander gratings may extend to the opposite side of the out-coupling grating, as seen from the first gratings. This helps to optimize the usage of the surface area of the waveguide for practical applications, since at least part of the light is adapted to travel from the first exit pupil expander gratings to the second exit pupil expander gratings via a region of the waveguide layer on which the out-coupling grating is located, and further back to the out-coupling grating.

In some embodiments, the in-coupling gratings are adapted to couple light into the waveguide layers using the first positive and first negative diffraction orders, such as the first positive and negative transmission diffraction orders.

Next, embodiments of the invention and advantages thereof are discussed in more detail with reference to the attached drawings.

DETAILED DESCRIPTION OF EMBODIMENTS

In one embodiment, the present approach comprises uniquely in-coupling only wavelengths below a threshold value using an in-coupler that splits FOV into two parts by +/−1st diffraction orders and exhibits such a small grating period that wavelengths above the threshold value experience only the zeroth order diffraction.

Figure 1:
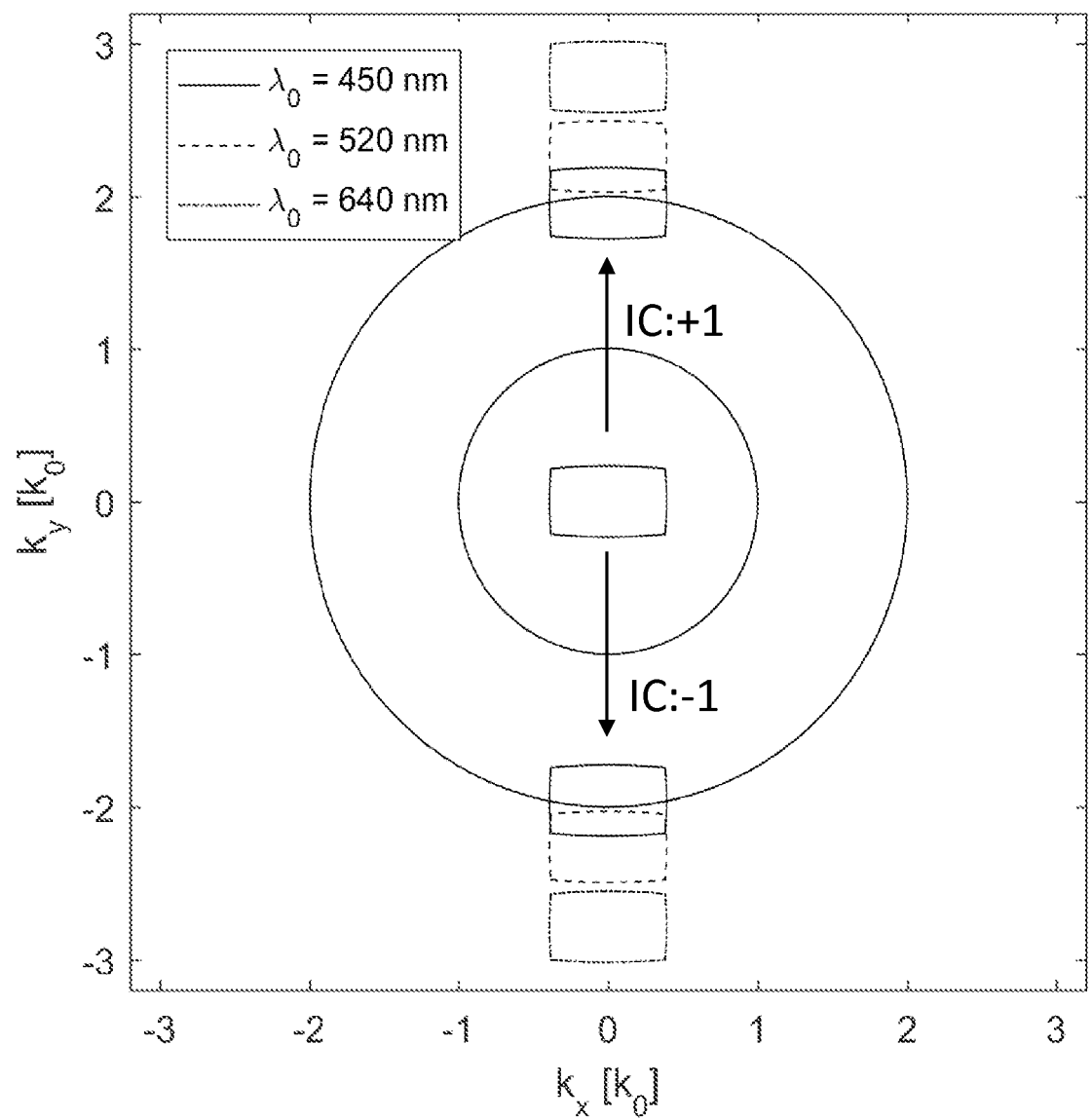
FIG. 1 shows a wave vector diagram illustrating the operation and benefit of the present invention according to one embodiment.

This is illustrated in FIG. 1 that shows the wave vector analysis for the in-coupling grating that has a grating vector parallel to the y-axis. It is assumed that the lightguide has refractive index of 2.0, it resides in the xy-plane, and the virtual image has 52 deg diagonal FOV with 16:9 aspect ratio. The +/−1st orders moves the FOV box from the center into the annulus. The inner radius of annulus is defined by the refractive index of air (=1.0) and the outer radius by the refractive index of the waveguide (=2.0). The FOV points inside the annulus propagate via total internal reflection inside the waveguide. The FOV points outside the annulus are forbidden modes that never exist. It can be seen from FIG. 1 that only wavelength below 520 nm couple into the lightguide. The total FOV at 450 nm can be obtained by combining the FOV parts in-coupled by +/−1st orders. The same applies for all wavelengths that are smaller than 450 nm and still remain inside the annulus. This means that if the incident light, for instance, consists of wavelength bands B=[430,450] nm and G=[520,550] nm, then the in-coupler couples only B wavelengths and G wavelengths propagate through the grating with the zero order diffraction.

Figure 2:
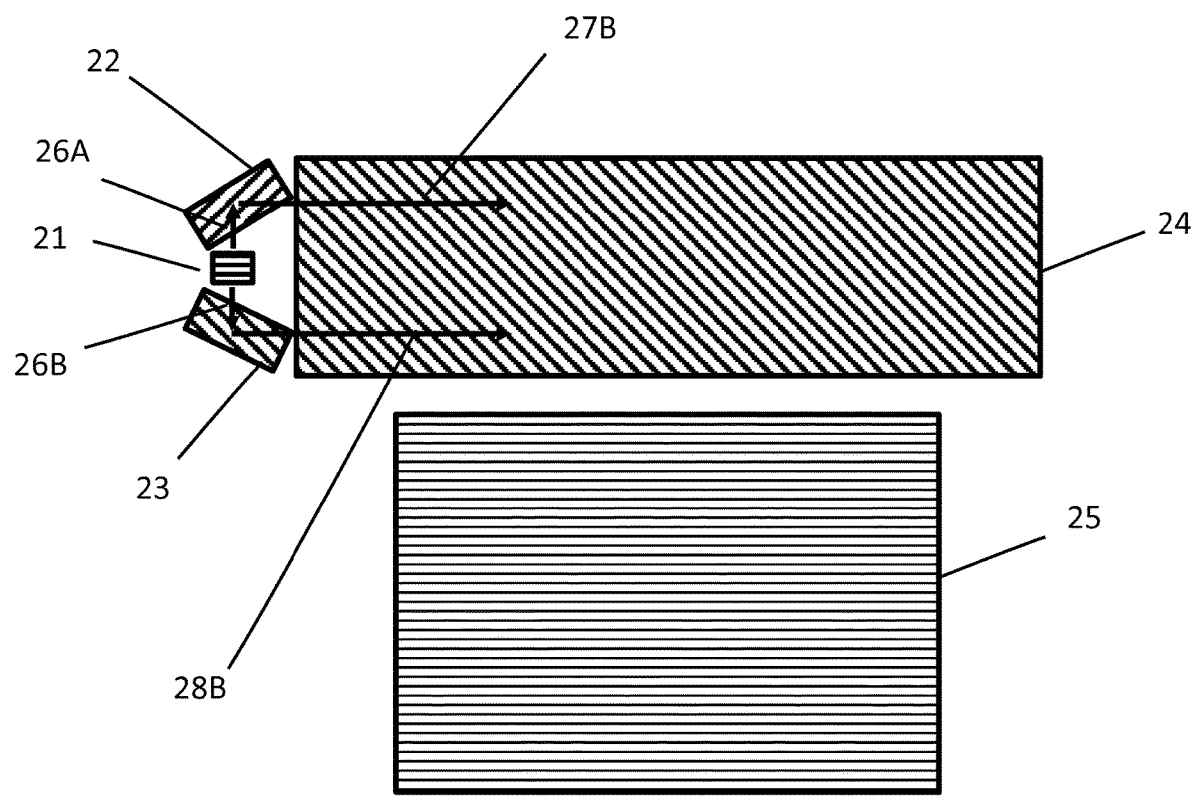
FIG. 2 illustrates in top view one practical waveguide layout having a single second EPE grating.

The presented in-coupling scheme can be used with traditional waveguide grating configurations. An example is given in FIG. 2. The in-coupling grating 21 is surrounded by two reflective gratings 22, 23 that turn the in-coupled light rays 26A, 26B on the exit pupil expansion (EPE) grating 24 that finally turns the light rays 27B, 28B on the out-coupling grating 25.

Figure 3:
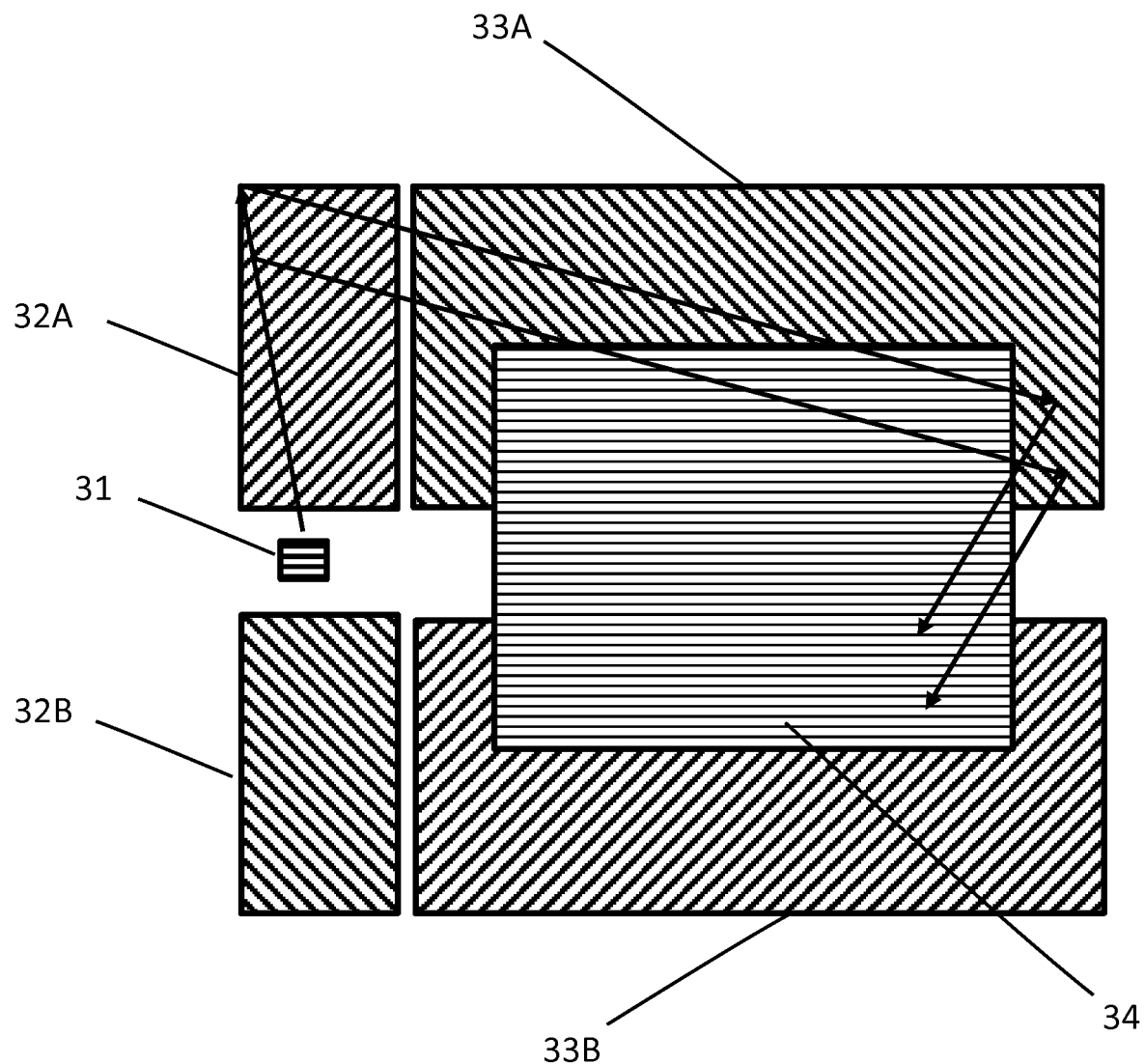
FIG. 3 illustrates in top view of another practical waveguide layout having a two second EPE gratings.
Figure 4:
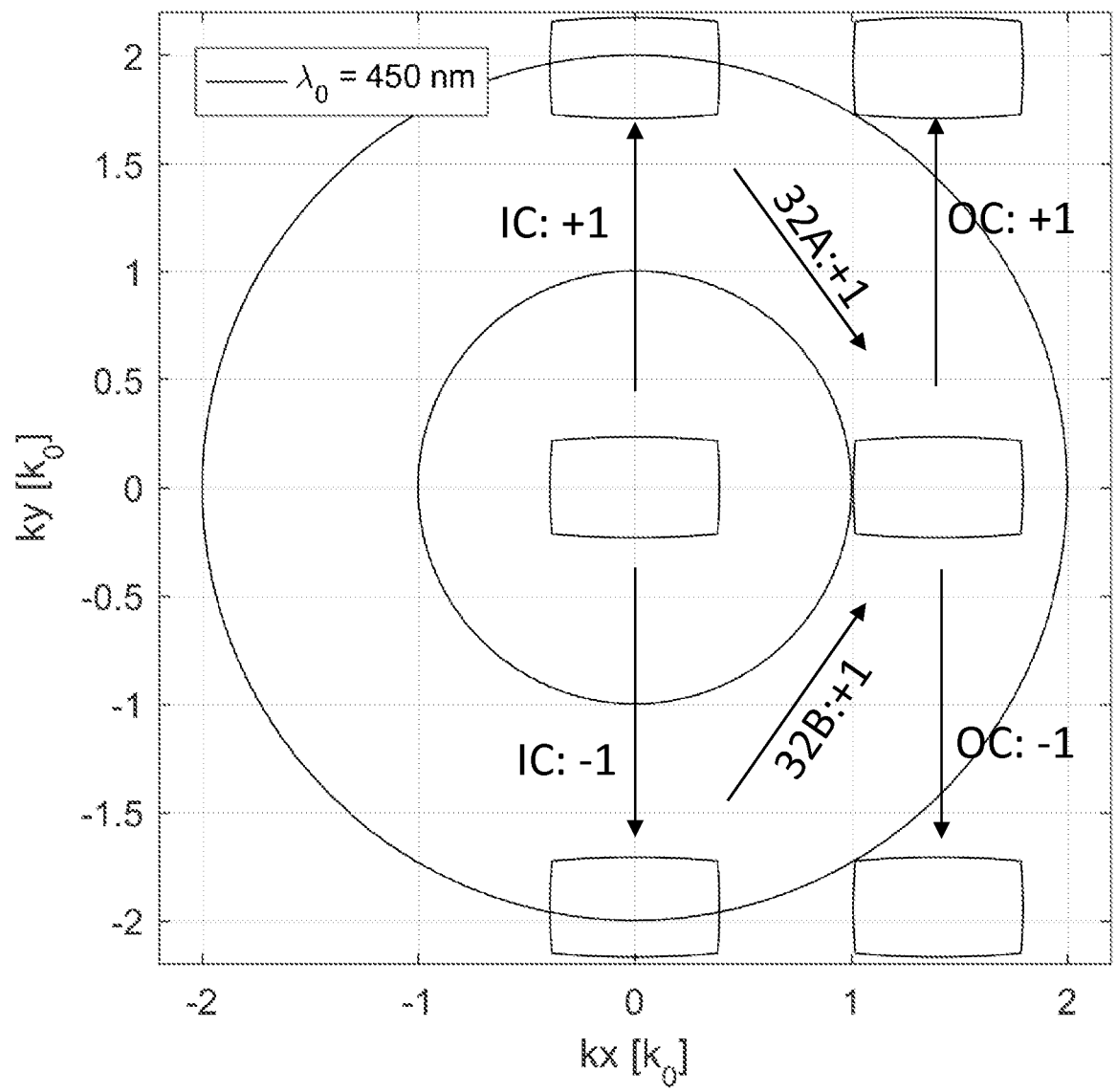
FIG. 4 shows a wave vector diagram illustrating the operation and benefit of the embodiment of FIG. 3.

An alternative scheme is presented in FIG. 3. The in-coupling grating 31 is accompanied with first EPE gratings 32A, 32B that turn and expand light on the second EPE gratings 33A, 33B. Light is out-coupled by the out-coupling grating 34A. By properly selecting the gratings vectors in this configuration, light rays can be fed through the out-coupler on the EPE gratings 33A, 33B without any diffraction. This can be seen from the wave vector analysis example shown in FIG. 4. Out-coupler diffracts the light rays coming from the first EPE gratings out-side the annulus, i.e. no diffraction occurs. Light transportation through the out-coupler on the EPE gratings enables smaller grating areas and thus better form factor for the waveguide.

Figure 5:
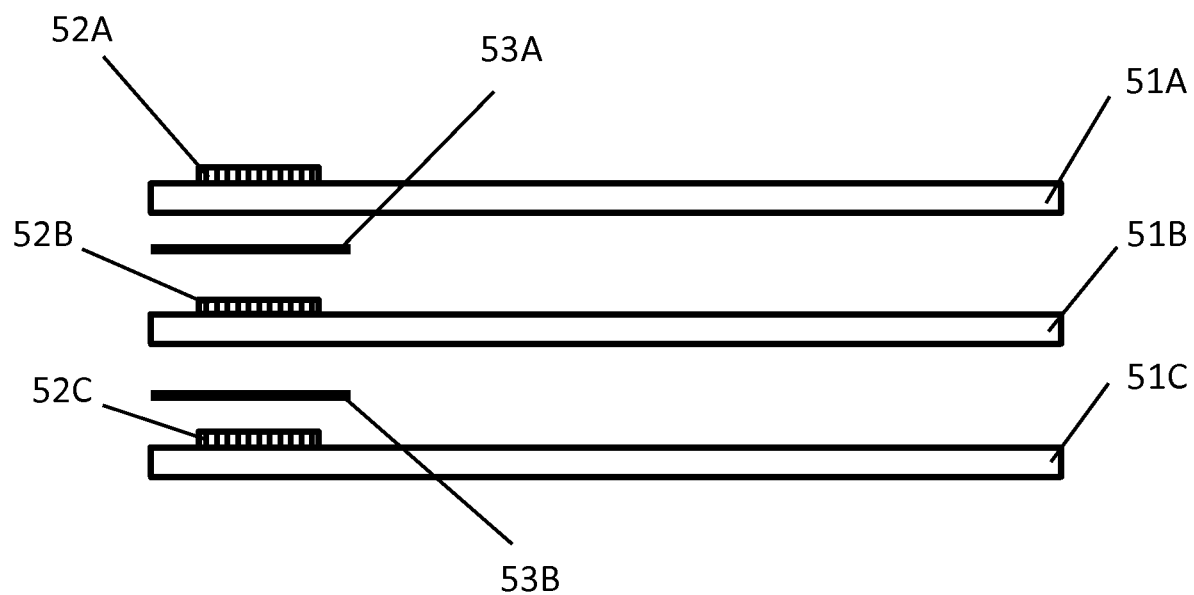
FIG. 5 illustrates in a side view a waveguide stack according to one embodiment.

The illustrated in-coupling scheme can be directly utilized in a RGB wave guide stack. FIG. 5 shows an exemplary stack. Waveguides 51A, 51B, and 51C are designated for blue, green and red light respectively and they contain in-coupling gratings 52A, 52B, 52C. To prevent blue light to in-couple waveguides of green and red light, an optical filter 53A that reflects the blue light back to the waveguide 51A is placed between the waveguides 51A and 51B. In a similar manner, the optical filter that reflects green light is placed between the waveguides 51B and 51C. The waveguide 51C receives only red light. The filters 53A and B can be also absorptive filters.

All the presented embodiments can be utilized with both uncoherent (LED) and coherent (laser) light image projectors and projection schemes which are known in the art of waveguide displays.

Embodiments of the invention are most suitably used in see-through near-to-the-eye display (NED) devices or other HMDs.

CITATIONS LIST

Patent Literature

US 2014/0064655 A1

The invention claimed is:
1. A waveguide display element comprising:
a waveguide body,
an in-coupling grating arranged to the waveguide body,
two first exit pupil expander gratings on different sides of the in-coupling grating corresponding to said separate directions,
two second exit pupil expander gratings at least partly on different sides of the out-coupling grating that are adapted to receive light from the two exit pupil expander gratings, respectively, and
a single out-coupling grating adapted to receive light from at least one of the second exit pupil expander gratings, wherein:
the in-coupling grating is configured to couple incoming light into the waveguide body into two separate directions using opposite diffraction orders for splitting the field of view of the incoming light,
the grating is further configured such that said coupling takes place only at wavelengths below a threshold wavelength residing in the visible wavelength range,
the in-coupling grating has a period, which is short enough to prevent coupling of wavelengths above said threshold wavelength into the waveguide body, and
at least part of the light is adapted to travel from the first exit pupil expander gratings to the second exit pupil expander gratings via a region of the waveguide layer on which the out-coupling grating is located, and further back to the out-coupling grating.

2. The element according to claim 1, wherein the threshold wavelength is in the range of 500-540 nm, 620-660 nm.

3. The element according to claim 2, wherein the waveguide body has an index of refraction higher than 1.8.

4. The element according to claim 1, wherein the waveguide body has an index of refraction higher than 1.8.

5. The element according to claim 1, wherein the in-coupling gratings are adapted to couple light into the waveguide layers using the first positive and first negative diffraction orders, such as the first positive and negative transmission diffraction orders.

6. A waveguide stack for diffractive displays, the stack comprising:
at least two waveguide layers, wherein at least one of the waveguide layers is a waveguide element according to claim 1.

7. A waveguide stack for diffractive displays, the stack comprising:
at least three waveguide layers, at least two of which are according to claim 1 and have different threshold wavelengths.

8. The stack according to claim 7, wherein:
a first of the waveguide layers comprises a first in-coupling grating adapted to couple light to a first waveguide layer only below a first threshold wavelength,
a second of the waveguide layers comprises a second in-coupling grating adapted to couple light to a second waveguide layer only below a second threshold wavelength higher than the first threshold wavelength, and
a third waveguide layer comprises an in-coupling grating configured to couple light to a third waveguide layer above said second threshold wavelength,
the stack further comprising:
a first wavelength filter element arranged between the first and the second waveguide layer and arranged to prevent wavelengths below the first threshold wavelength entering the second in-coupling grating, and
a second wavelength filter element arranged between the second and the third waveguide layer and arranged to prevent wavelengths below the second threshold wavelength entering the third in-coupling grating.

9. The stack according to claim 8, wherein the first and/or second wavelength filter is a reflective filter or absorptive filter.

10. A see-through display device comprising:
a waveguide display element according to claim 1, and
a waveguide display image projector directed at the in-coupling grating and being capable of presenting a multicolor image comprising wavelengths both above and below said threshold wavelength.

11. The element according to claim 1, wherein the waveguide body has an index of refraction of from about 1.9 to about 2.1.

12. A waveguide display element comprising:
a waveguide body,
an in-coupling grating arranged to the waveguide body,
two first exit pupil expander gratings on different sides of the in-coupling grating corresponding to said separate directions,
two second exit pupil expander gratings at least partly on different sides of the out-coupling grating that are adapted to receive light from the two exit pupil expander gratings, respectively, and
a single out-coupling grating adapted to receive light from at least one of the second exit pupil expander gratings, wherein:
the in-coupling grating is configured to couple incoming light into the waveguide body into two separate directions using opposite diffraction orders for splitting the field of view of the incoming light,
the grating is further configured such that said coupling takes place only at wavelengths below a threshold wavelength residing in the visible wavelength range,
the in-coupling grating has a period, which is short enough to prevent coupling of wavelengths above said threshold wavelength into the waveguide body, and
the second exit pupil expander gratings extend to the opposite side of the out-coupling grating, as seen from the first exit pupil expander gratings.

13. The element according to claim 12, wherein at least part of the light is adapted to travel from the first exit pupil expander gratings to the second exit pupil expander gratings via a region of the waveguide layer on which the out-coupling grating is located, and further back to the out-coupling grating.

* * * * *